Jan. 9, 1968  L. H. JORDAN ET AL  3,363,075
VEHICLE SPEED CHANGE INDICATOR SWITCH
Filed Oct. 23, 1965

INVENTOR
LESLIE H. JORDAN
JOHN ARDEN
BY
Fetherstonhaugh & Co.
ATTORNEYS

United States Patent Office 3,363,075
Patented Jan. 9, 1968

3,363,075
VEHICLE SPEED CHANGE INDICATOR SWITCH
Leslie H. Jordan, 2021 E. Broadway, Vancouver, British Columbia, Canada, and John Arden, 6049 Portland Ave., Burnaby, British Columbia, Canada
Filed Oct. 23, 1965, Ser. No. 503,050
10 Claims. (Cl. 200—83)

ABSTRACT OF THE DISCLOSURE

A speed change indicator switch adapted to be connected to the intake manifold of the engine of a motor vehicle. The switch is connected in circuit with stop or warning lights of the vehicle. When the vehicle decelerates, the pressure in the intake manifold drops and this causes the switch to operate to put the stop or warning lights on for a predetermined period of time.

---

Figure 1:
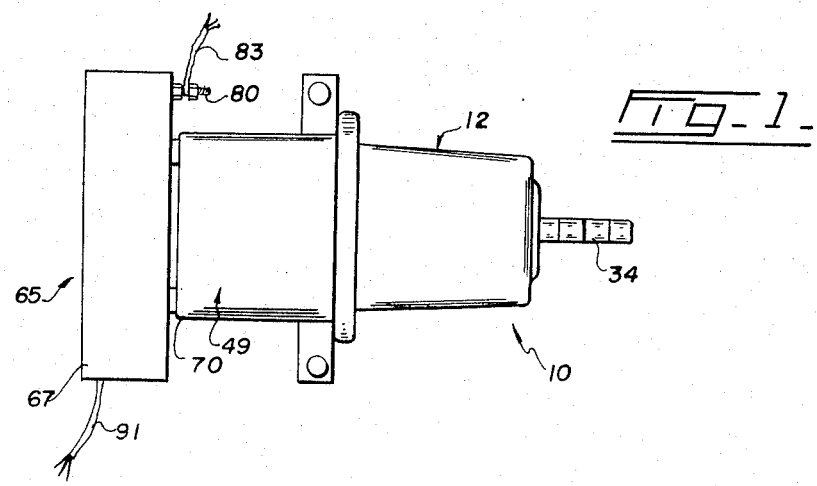

This invention relates to switches to be used in motor vehicles in order to indicate instantly changes of speed thereof to a slower speed.

This indicator switch is adapted to be mounted in a motor vehicle and to be connected in circuit with stop or warning lights of that vehicle. The switch is also connected to the intake manifold of the engine of the vehicle, and it operates to put the stop or warning lights on the instant the throttle or accelerator operates to slow down the engine. Switches have been produced in the past for this purpose, but they have not been altogether satisfactory. One reason for this is that the prior switches operated every time the driver's foot was taken off the accelerator so that the stop lights were constantly flickering on and off in traffic or in other places where the speed of the engine and vehicle was constantly being changed. Another disadvantage of the prior switches is that they operated every time the speed was reduced during all ranges of speed.

An advantage of the present speed change indicator switch is that it can be set so as to operate only in a desired speed range, usually at high speeds, since this is the time that it is necessary instantly to warn the driver of a following vehicle of a sudden slowdown of the vehicle in which the switch is mounted. This switch causes the stop or warning lights to operate the instant the driver takes his foot off the accelerator, thereby giving a warning ahead of one which would normally be given when he applies the brakes. Another advantage is that once the indicator switch is operated, it remains in operation for a predetermined time so that the stop or warning lights do not come on and off during numerous changes of speed which the driver might have to make under some traffic conditions. Furthermore, a flasher may be used with this indicator switch to cause the stop or warning lights to flash when put into operation by said switch.

The expression "warning lights" is intended to include the regular brake lights of the vehicle or special lights mounted on the rear of the vehicle for this purpose. If special lights are used, they may be red, but some other distinctive colour, such as amber, may be used.

A speed change indicator switch according to the present invention comprises a casing having an open end and forming a vacuum chamber, a diaphragm across and closing said casing end, said casing having a port therein communicating with the vacuum chamber and adapted to be connected to the intake manifold of a vehicle engine, air bleed means for the chamber, a stem having an end engaging the diaphragm on the side thereof remote from the vacuum chamber, and switch means controlled by the stem and adapted to be connected in circuit with warning lights of the vehicle, said switch means being operated by the stem when the vacuum in said chamber rises to a predetermined level and remaining in operation until the vacuum drops below said level.

In a preferred form of switch, a check valve is provided at the port of the vacuum chamber, said valve opening away from the port.

Figure 3:
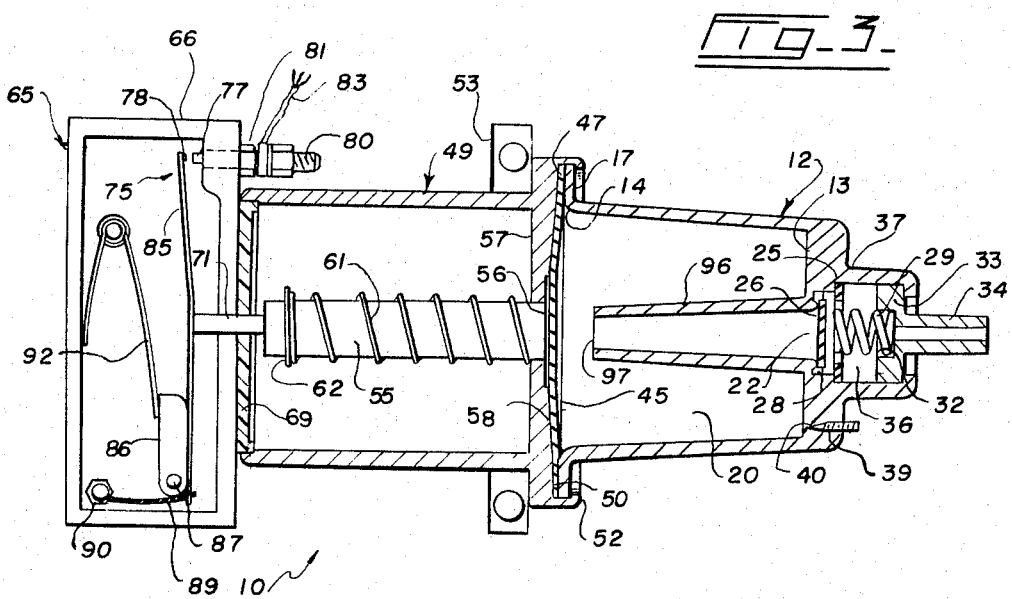
Figure 2:
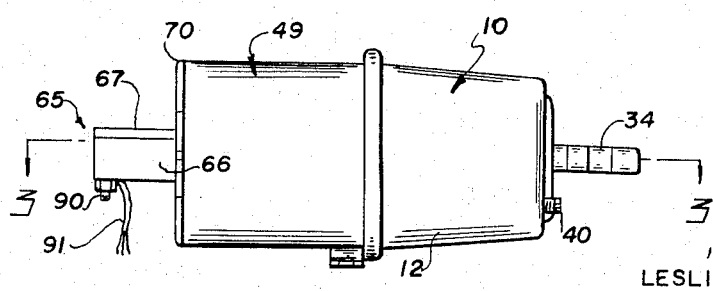

An example of this invention is illustrated in the accompanying drawings, in which, FIGURE 1 is a plan view of the speed change indicator switch, FIGURE 2 is a side elevation of the switch, and FIGURE 3 is an enlarged horizontal section taken substantially on the line 3—3 of FIGURE 2.

Referring to the drawings, 10 is a speed change indicator switch according to the present invention including a casing 12 having an end wall 13 at one end, and an open opposite end 14. Casing 12 has a flange 17 around its open end. This casing forms a relatively large vacuum chamber 20, and a port 22 is formed in end wall 13 and communicates with the vacuum chamber. It is preferable to provide a check valve for port 22 and opening outwardly away therefrom. In this example, the check valve comprises a valve disc 25 having a facing 26 formed of resilient material, such as rubber. This disc is pressed against the bottom of a recess 28 formed in end wall 13 and into which port 22 opens. A spring 29 normally presses disc 25 against the bottom of recess 28 to close port 22. Spring 29 is mounted in a recess 32 formed in a head 33 having a tube 34 projecting outwardly therefrom. Head 33 fits in a relatively large cavity 36 formed in end wall 13 and opening outwardly therefrom, said head being retained in position by a portion 37 of casing 12 rolled over the head. Tube 34 is adapted to fit into a hose or the like, not shown, which extends to the intake manifold of the engine of the vehicle on which switch 10 is mounted.

A very small air bleed 39 is provided in casing wall 13 and is adapted to permit air to flow slowly into chamber 20. Air bleed 39 is controlled by an adjustable needle valve 40 threaded therein.

The open end 14 of casing 12 is closed by a flexible diaphragm 45 which extends across said end. In this example, flange 17 of casing 12 fits into an annular recess 47 formed in the adjacent end of a second casing 49. Flange 17 presses diaphragm 45 against a shoulder 50 formed in said recess 47, and the flange is held in position by a portion 52 of casing 49 which is rolled over said flange. Mounting lugs 53 are provided in casing 49 by means of which said casing can be mounted in a vehicle.

A stem 55 in casing 49 is connected at 56 to the centre of diaphragm 45 and extends away therefrom in a direction away from vacuum chamber 20. Stem 55 slidably extends through a wall 57 extending across the interior of casing 49 at the bottom of recess 47, said wall forming a bearing for the stem. Wall 57 has a substantially concave outer surface 58 facing diaphragm 45. Resilient means, such as a spring 61 surrounds stem 55 and is connected to said stem near the outer or free end thereof by a clip 62, said spring being compressed between the clip and wall 57 so that it urges said stem to an outer position, at which time, diaphragm 45 is drawn towards surface 58 of wall 57.

A switch housing 65 is mounted at the outer end of casing 49. This housing includes an open-topped base 66 and a cover 67 mounted thereon, said cover being removed in FIGURE 3. A plug 69 is secured to housing base 66 and snugly fits within the outer end of casing 49, the edge of the latter being rolled over the plug as shown at 70 in FIGURE 2. Stem 55 has a reduced outer end 71 slidably extending through plug 69 and the adjacent wall of base 66. An electrical switch 75 is mounted in the base of housing 65. This switch includes first and second aligned contacts 77 and 78. Contact 77 is stationary, while contact 78 is movable towards and away from the first contact to close and open switch 75. Contact 77 is mounted on the end of a screw 80 which is threaded in the wall of base 66 so that said contact can be adjusted towards and away from contact 78. A lock nut 81 threaded on screw 80 retains the latter in any adjusted position. A wire 83 is connected to screw 80 and is adapted to extend to the electrical circuit of the warning lights of the vehicle. If desired, wire 83 may connect switch 75 to an electrical flasher, not shown, which in turn is connected to the warning lights.

Contact 78 is mounted on a spring arm 85 which is carried by an insulation block 86 pivotally mounted on a pin 87 secured to and projecting upwardly from the bottom of housing base 66. A flexible wire 89 connects metal arm 85 to a contact 90 which extends through the bottom of base 66 and has a wire 91 connected thereto, said wire extending to the electrical circuit of the vehicle warning lights.

Arm 85 bears against the reduced end 71 of stem 55 and is urged against said end by a spring 92. Spring 61 on stem 55 normally moves the stem to its outer position, at which time arm 85 is in such a position that contact 78 is spaced away from contact 77. When the stem is moved against the pressure of spring 61, spring 92 moves arm 85 to permit contacts 78 and 77 to engage. The amount of movement to cause this engagement is determined by the position of screw 80 which, in turn, determines the position of contact 77 relative to contact 78.

Although not absolutely necessary, it is preferable to provide a tube 96 in vacuum chamber 20, said tube being mounted on the inner surface of end wall 13 over port 22 and extending towards and terminating at 97 just clear of the centre of diaphragm 45.

When indicator switch 10 is mounted in a vehicle, tube 34 is connected by a hose or the like to the intake manifold of the vehicle engine. Switch 75 is connected to the operating circuit of the warning lights of the vehicle by wires 83 and 91. As the vehicle is travelling along a road, if the driver suddenly takes his foot off the accelerator, the vacuum in the engine manifold instantly rises, so that the pressure in chamber 20 instantly drops, and this causes diaphragm 45 to move inwardly of the chamber, moving stem 55 in the same direction to allow contact 78 to move towards contact 77. If the manifold vacuum rises to a predetermined level, contacts 78 and 77 are engaged to close switch 75 and cause the warning lights of the vehicle to go on. Contact 77 is set in such a position that it can be engaged by contact 78 only when the vehicle is travelling at a predetermined speed, for example, 50 miles an hour, when the vacuum rise occurs. As soon as the rise in vacuum ceases, valve disc 25 is moved to close port 22 so that the level of vacuum remains in chamber 20 regardless of whether or not the accelerator is again depressed. Air leaks into this chamber through air bleed 39 at a predetermined rate so that the vacuum drops in chamber 20 at a desired rate thereby causing switch 75 to be opened after a desired interval. Thus the check valve and the air bleed cause the warning lights to remain on for a certain interval after they have been brough on by the indicator switch. This keeps the warning lights on even though the driver may be alternately depressing and releasing the accelerator at high speeds and during certain traffic conditions. Thus, indicator switch is such that the warning lights will not go off and on during a series of rapid speed changes, and said lights will come on only when there is sudden deceleration during the time the vehicle is travelling above a predetermined speed. If a flasher is used in the system, the warning lights will flash evenly for a predetermined time after each operation of the indicator switch.

What we claim as our invention is:

1. A speed change indicator switch for vehicles having internal combustion engines and warning lights, comprising a casing having an open end and forming a vacuum chamber, a diaphragm across and closing said casing end, said casing having a port therein communicating with the vacuum chamber, tube means connected to the casing outside the chamber and enclosing said port, said tube means being adapted to be connected to the intake manifold of a vehicle engine, a check valve closing said port and opening away therefrom when pressure in said tube means decreases relative to pressure in the chamber, air bleed means for the chamber, a stem having an end engaging the diaphragm on the side thereof remote from the vacuum chamber, and switch means operated by the stem and adapted to be connected in circuit with warning lights of the vehicle, said switch means being operated by the stem when the pressure in said chamber drops to a predetermined level and remaining in operation until the pressure rises above said level.

2. A speed change indicator switch for vehicles having internal combustion engines and warning lights, comprising a casing having an open end and forming a vacuum chamber, a diaphragm across and closing said casing end, said casing having a port therein communicating with the vacuum chamber, tube means connected to the casing outside the chamber and enclosing said port, said tube means being adapted to be connected to the intake manifold of a vehicle engine, a check valve closing said port and opening away therefrom when pressure in said tube means decreases relative to pressure in the chamber, air bleed means for the chamber, a stem having an end connected to the diaphragm on the side thereof remote from the vacuum chamber, resilient means normally urging said stem and diaphragm in a direction away from said chamber, and switch means operated by the stem and normally retaining in open position by said resilient means and adapted to be connected in circuit with the warning lights of the vehicle, said switch means being operated by the stem when the pressure in said chamber drops to a predetermined level and remaining in operation until the pressure rises above said level.

3. A switch as claimed in claim 1 including means for regulating said air bleed to control the rate of flow of air into the vacuum chamber.

4. A switch as claimed in claim 1 including means for adjusting the predetermined pressure level at which the switch means is operated.

5. A speed change indicator switch for vehicles having internal combustion engines and warning lights, comprising a casing having an open end and forming a vacuum chamber, a diaphragm across and closing said casing end, said casing having a port therein communicating with the vacuum chamber, tube means connected to the casing outside the chamber and enclosing said port, said tube means being adapted to be connected to the intake manifold of a vehicle engine, a check valve closing said port and opening away therefrom when pressure in said tube means decreases relative to pressure in the chamber, air bleed means for the chamber, a stem having an end connected to the diaphragm on the side thereof remote from the vacuum chamber, first resilient means normally urging said stem and diaphragm in a direction away from said chamber, and a switch adjacent said stem, second resilient means for the switch urging said switch into closed position, said switch being normally retained in an open position by the stem under the action of said first resilient means and against the action of said second resilient means and adapted to be connected in circuit with the warning lights of the vehicle, said switch being closed when the pressure in said chamber drops to a predetermined point to cause the diaphragm to move the stem against the pressure of said first resilient means.

6. A speed change indicator switch for vehicles having internal combustion engines and warning lights, comprising a casing having an open end and forming a vacuum chamber, a diaphragm across and closing said casing end, said casing having a port therein communicating with the vacuum chamber, tube means connected to the casing outside the chamber and enclosing said port, said tube means being adapted to be connected to the intake manifold of a vehicle engine, a check valve closing said port and opening away therefrom when pressure in said tube means decreases relative to pressure in the chamber, air bleed means for the chamber, a stem having an end connected to the diaphragm on the side thereof remote from the vacuum chamber, resilient means normally urging said stem and diaphragm in a direction away from said chamber, a switch mounted adjacent the stem and adapted to be connected in circuit with the warning lights of the vehicle, said switch having a stationary first contact and a second contact movable against and away from the first contact to close and open the switch, said stem being connected to said second contact and normally retaining the latter away from the first contact, said switch being closed when the pressure in said chamber drops to a predetermined point to cause the diaphragm to move the stem against the pressure of said resilient means, and means for adjusting said first contact towards and away from the second contact to regulate the predetermined pressure level in said chamber at which said switch is closed.

7. A speed change indicator switch for vehicles having internal combustion engines and warning lights, comprising a casing having an end and forming a vacuum chamber, said end having a vacuum port therein communicating with the vacuum chamber, tube means connected to said end outside the chamber and enclosing the vacuum port, said tube means being adapted to be connected to the intake manifold of a vehicle engine, a check valve closing said port and opening away therefrom when pressure in said tube means decreases relative to pressure in the chamber, air bleed means for the chamber, a diaphragm across the chamber and spaced from said end thereof, a stem connected to the diaphragm centrally thereof on the side of the diaphragm remote from the chamber and extending away from said diaphragm, bearing means adjacent the diaphragm and slidably supporting the stem, resilient means connected to the stem and pressing against the bearing means normally moving the diaphragm away from the vacuum port and retaining the stem in an outer position, and a switch mounted adjacent the stem and adapted to be connected in circuit with the warning lights of the vehicle, said switch having a stationary first contact and a second contact movable against and away from the first contact to close and open the switch, said second contact being resiliently urged towards the first contact, said stem being connected to the second contact and retaining the latter away from the first contact when the stem is in the outer position thereof, said switch being closed when the vacuum in said chamber drops to a predetermined point to cause the diaphragm to move the stem against the pressure of said resilient means.

8. A switch as claimed in claim 7 including means for adjusting said first contact towards and away from the second contact to regulate the predetermined level of pressure in said chamber at which said switch is closed.

9. A switch as claimed in claim 7 including a tube in the vacuum chamber connected to said end of the chamber over the vacuum port thereof, said tube extending towards and terminating near said diaphragm.

10. A switch as claimed in claim 7 including means for regulating said bleed to control the rate of flow of air into the vacuum chamber.

References Cited
UNITED STATES PATENTS

| | | | |
|---|---|---|---|
| 1,387,746 | 8/1921 | Webb | 200—83 |
| 1,388,628 | 8/1921 | Berdon | 200—19 |
| 2,131,264 | 9/1938 | Benjamin | 200—83 |
| 2,833,880 | 5/1958 | Repkow | 200—83 |

BERNARD A. GILHEANY, *Primary Examiner.*

H. B. GILSON, *Assistant Examiner.*